United States Patent [19]

Vail, III

[11] Patent Number: 4,804,918

[45] Date of Patent: Feb. 14, 1989

[54] DUAL EXCITATION ACOUSTIC PARAMAGNETIC LOGGING TOOL

[75] Inventor: William B. Vail, III, Bothell, Wash.

[73] Assignee: ParaMagnetic Logging, Inc., Woodinville, Wash.

[21] Appl. No.: 153,061

[22] Filed: Feb. 8, 1988

Related U.S. Application Data

[63] Continuation-in-part of Ser. No. 926,390, Nov. 3, 1986, Pat. No. 4,724,385.

[51] Int. Cl.$^4$ .............................................. G01R 33/20
[52] U.S. Cl. .................................... 324/303; 324/307; 324/300
[58] Field of Search ............... 324/300, 303, 307, 310, 324/311, 312, 313, 314, 318, 320, 322

[56] References Cited

U.S. PATENT DOCUMENTS

| | | | |
|---|---|---|---|
| 4,438,400 | 3/1984 | Patt | 324/312 |
| 4,528,508 | 7/1985 | Vail, III | 324/303 |
| 4,689,565 | 8/1987 | Kemner | 324/309 |
| 4,724,385 | 2/1988 | Vail, III | 324/303 |
| 4,737,712 | 4/1988 | Stormont | 324/307 |

*Primary Examiner*—Michael J. Tokar

[57] ABSTRACT

New methods and apparatus are disclosed which allow measurement of the presence of oil and water in gelogical formations using a new physical effect called the Acoustic Paramagnetic Logging Effect (APLE). The presence of petroleum in formation causes a slight increase in the earth's magnetic field in the vicinity of the reservoir. This is the phenomena of paramagnetism. Application of an acoustic source to a geological formation at the Larmor frequency of the nucleous present causes the paramagnetism of the formation to disappear. This results in a decrease in the earth's magnetic field in the vicinity of the oil bearing formation. Repetitively frequency sweeping the acoustic source through the Larmor frequency of the nucleons present (approx. 2 kHz) causes an amplitude modulation of the earth's magnetic field which is a consequence of the APLE. The amplitude modulation of the earth's magnetic field is measured with an induction coil gradiometer and provides a direct measure of the amount of oil and water in the excitation zone of the formation. The phase of the signal is used to infer the longitudinal relaxation times of the fluids present, which results in the ability in general to separate oil and water and to measure the viscosity of the oil present. Such measurements may be preformed in open boreholes and in cased well bores. The Dual Excitation Acoustic Paramagnetic Logging Tool employing two acoustic sources is also described.

2 Claims, 4 Drawing Sheets

DUAL EXCITATION ACOUSTIC PARAMAGNETIC LOGGING TOOL

This invention was made with Government support under DOE Grant No. DE-FG06-84ER13294 entitled "Validating the Paramagnetic Logging Effect" awarded by the Division of Advanced Energy Projects, Office of Basic Energy Sciences, of the U.S. Department of Energy. The Government has certain rights in this invention.

This appplication is a continuation-in-part application of Ser. No. 926,390 filed on Nov. 3, 1986 entitled "Acoustic Paramagnetic Logging Tool" which issued on Feb. 9, 1988 as U.S. Pat. No. 4,724,385.

This invention relates to the use of a new type of nuclear magnetic resonance method and apparatus which remotely senses and detects the presence of unknown petroleum reservoirs in geological formations and also allows the direct measurement of significant portions of oil and water fluid in the vicinity of a borehole within a petroleum reservoir. The new method directly measures the natural paramagnetism of the formation with a new physical "effect" called the Acoustic Paramagnetic Logging Effect (APLE).

In U.S. Pat. No. 4,528,508 entitled "Nuclear Magnetic Resonance Method and Apparatus for Remote Detection and Volumetric Measurement of Petroleum Reserves" which issued on July 9, 1985, a new type of nuclear magnetic resonance method and apparatus is described. The continuation-in-part U.S. Pat. No. 4,656,422 (Ser. No. 720,943) entitled "Oil Well Logging Tools Measuring Paramagnetic Logging Effect for Use in Open Boreholes and Cased Well Bores" which issued on Apr. 7, 1987 describes and new effect exhaustively and names the new effect the Paramagnetic Logging Effect.

A brief review of the physical mechanisms responsible for the PLE is appropriate because the APLE is best explained in terms of the PLE. The presence of petroleum in formation causes a slight increase in the earth's static magnetic field. This is the phenomenon of paramagnetism. Application of an A.C. current to the walls of the open borehole at approximately 2 kHz causes an A.C. magnetic field which in turn causes the paramagnetism of the formation of disappear. This results in a decrease in the earth's magnetic field in the vicinity of the oil bearing formation. This decrease is a direct measurement of the volume of oil and water within a wall defined excitation zone of the formation which extends to 30 feet into formation. Repetitively sweeping the current through 2 kHz causes an amplitude modulation of the earth's magnetic field which is measured with an induction coil gradiometer. The amplitude of the signal from the gradiometer is a direct measure of the amount of oil and water in the excitation zone, and the phase of the signal is used to infer the longitudinal relaxation times of the fluids present, which results in the ability in general to separate oil and water and to measure the viscosity of the oil present.

In the case of the PLE, an A.C. magnetic field applied to the formation is used to disorient the nuclei present, which is called the "excitation" of the formation, which results in the "saturation" of the nuclear species in formation. Here, saturation means that the paramagnetism disappears on excitation. Before the initial application of the A.C. magnetic field, there were initially an excess of magnetic moments aligned in the direction of the earth's magnetic field. Subsequently, an applied A.C. magnetic field at the Larmor frequency 'equalized' the two populations, resulting in the saturation phenomenon. After the A.C. magnetic field at the Larmor frequency is turned off (or shifted to another frequency), then the nuclear magentic moments then redistribute themselves into their original states such that an excess of magnetic moments again become aligned in the direction of the earth's magnetic field. This dynamic alignment process takes place with a time constant called the longitudinal relaxation time, $T_1$. Therefore, the PLE is essentially a repetitive excitation-saturation -relaxation process involving the nuclear moments which results in an amplitude modulation of the earth's magnetic field in the vicinity of the oil reservoir which is subjected to a periodically sweeping A.C. magnetic field which repetitiously passes through the Larmor frequency of protons in the earth's magnetic field (roughly 2 kHz).

In summary, therefore, in the PLE, the "excitation" is caused by the A.C. magnetic field and the relaxation is dominated by the longitudinal relaxation time $T_1$. By contrast, in the APLE, application of acoustic waves at the Larmor frequency of the nucleons present places the nucleons into a state of acoustic nuclear magnetic resonance. And the relaxation here is dominated by the longitudinal relaxation time $T_{1A}$ which is the appropriate relaxation time for the nucleons in the acoustic field present.

In an article entitled "Quantum Pseudospin Acoustics in Liquids" authored by A.V. Alekseev and U. Kh. Kopvillem (Magnetic Resonance and Related Phenomena, Edited by E. Kundla, et. al, Springer-Verlag, N.Y., 1979, page 239), acoustic waves are used to modulate a spin echo type experiment on water protons in a mixture of water and $CuSO_4$. The article states from theoretical analysis that "all EPR and NMR signals in liquids may be resonantly saturated by sound in principle". References are cited to further substantiate this claim.

Therefore, application of acoustic energy at the Larmor frequency to nucleons which are generally oriented in the earth's static magnetic field will cause the saturation of the paramagnetism present, and consequently the earth's magnetic field in the vicinity of saturated fluid will decrease slightly. If the acoustic energy is turned off, or is frequency swept to a different frequency, then the magnetic moments present will subsequently relax back along their original directions with a longitudinal relaxation time. The appropriate longitudinal relaxation time may be affected by the acoustic energy present. The earth's magnetic field would then return to it's original value. This process is then repeated indefinitely which provides a method of measuring the APLE.

Therefore, the Acoustic Paramagnetic Logging Effect is essentially a repetitive excitation-saturation-relaxation process involving the nuclear moments which results in an amplitude modulation of the earth's magnetic field in the vicinity of the oil reservoir which is subjected to a periodically sweeping acoustic energy field which repetitiously passes through the Larmor frequency of the protons in the the earth's magnetic field (roughly 2 kHz). The acoustic energy intensity is sufficient to cause excitation of the protons within the 'excitation zone' of the formation.

It should be noted that two or more acoustic sources may independently provide the required acoustic energy for excitation. As the acoustic energy sources are frequency swept in time, they may both have the same frequencies and phases. Or they may both have the same frequencies but different phase relationships, including the possibility of no-phase tracking between the two sources. Using two independent acoustic sources is just one example of a "dual excitation" scheme.

Two or more acoustic sources may also be operated at different frequencies. Once source, $S_1$, may provide acoustic energy described by amplitude $A_1(t)$, frequency $F_1(t)$, and phase $\phi_1(t)$ which is described as follows:

$$S_1(t) = A_1(t) \cos [2\pi F_1(t) + \phi_1(t)] \quad \text{Eq. 1}$$

Similarly, another source, $S_2$, may provide acoustic energy described by amplitude $A_2(t)$, frequency $F_2(t)$, and phase $\phi_2(t)$ which is described as follows:

$$S_2(t) = A_2(t) \cos [2\pi F_2(t) + \phi_2(t)] \quad \text{Eq. 2}$$

In one mode of operation, the amplitudes of the two sources are fixed in time, but both the frequencies are allowed to frequency sweep in time. For excitation to occur, acoustic energy is to be applied at the Larmor frequency of the protons present ($f_L$) which is approximately 2 kHz in the earth's magnetic field. It should be noted that $F_1(t)$ and $F_2(t)$ may have in theory many different time dependencies provided that the frequency difference between the two sources at some particular time T is equal to the Larmor frequency. Such a condition is expressed by the following equation:

$$F_1(T) - F_2(T) = f_L \quad \text{Eq. 3}$$

Therefore, if the frequency different between the two frequency sources passes through the Larmor frequency at a particular time T during the frequency sweep interval, then excitation of the protons present will occur at that particular time. This mechanism is another example of a "dual excitation" scheme. It should also be noted that the phases of the two sources can be chosen to be related in phase or not related in phase.

In addition, excitation will also occur in at least some circumstances provided that the frequency difference at a time T is equal to a multiple N of the Larmor frequency as follows:

$$F_1(T) - F_2(T) = N [f_L] \quad \text{Eq. 4}$$

In addition, a cosine time dependence was chosen in Eqs. 1 and 2, but any time dependence will accomplish the same result provided that the difference in frequencies of the different sources passes through the Larmor frequency during the frequency sweep intervals. Using several different sources under these circumstances is yet another example of a dual excitation arrangement.

The longitudinal relaxation times of the fluids present may be measured with an acoustic excitation analogously to the measurements performed with an A.C. magnetic field causing the excitation. For example, please refer to Equations 21 and 22 in U.S. patent application Ser. No. 720,943, now U.S. Pat. No. 4,656,422 (Ibid.).

Furthermore, it is expected that the acoustic energy will affect the connate water and oil differently in formation. Please refer to Chapter 17 in the book entitled "Theory of Magnetic Resonance", by Charles P. Poole, Jr., and Horacio A. Farach, Second Edition, John Wiley & Sons, unpublished to date, which discusses the interrelationship between thermal motions and acoustic energy and how such different physical processes affect the equilibrium population differences for nuclear and electronic magnetic moments which may be present in formation. It is evident from this work that acoustic energy may certainly be used to saturate nuclear and electronic magnetic moments which may be present. However, the high viscosity of oil causes one type of sound interaction, whereas the paramagnetic impurities present in connate water causes quite another type of interaction.

The electronic paramagnetic impurities present in connate water which are similar in nature to $CuSO_4$ magnetically, cause relaxation phenomena in accordance with the Solomon-Bloembergen Equations (Nuclear Magnetic Resonance in Biochemistry, Raymond A. Dwek, Clarendon Press, Oxford, 1973, Equations 9.1 and 9.2, on page 177). However, relaxation phenomena and saturation phenomena behave quite differently in viscous liquids such as oil in formation (see article entitled "Nuclear Magnetic Acoustic Resonance and Debye Vibration Potentials in Non-Viscous Liquids", by L.O. Bowen, Proc. Phys. Soc., 1966, Vol. 87, Page 717). The expected difference in saturation effects and longitudinal relaxation time effects on the APLE signal is expected to allow the separation of oil and water signals in general.

For example, if acoustic energy saturates the oil present at a certain acoustic power level which does not substantially saturate the connate water, that would be an experimentally optimum situation. Then only the oil signal would be seen in an open borehole. In addition, the APLE signal could be seen through borehole casing as well.

Conversely, if the acoustic energy saturates the water present before the oil present at a certain acoustic power level, then gradually increasing the power would allow discrimination between oil and water in both an open hole or cased hole situation.

In addition to saturation effects, the longitudinal relaxation times of the fluids may be, of course, measured to distinguish between oil and water as already mentioned in the cited U.S. patent application Ser. No. 720,943, now U.S. Pat. No. 4,656,422 (Ibid.).

Dramatically different saturation and relaxation time dependent phenomena are expected under the following different circumstances: (1) acoustic energy put into formation at the Larmor frequency of the nucleons present; (2) acoustic energy put into formation at the Larmor frequency of electronic paramagnetic impurities present; (3) acoustic energy put into formation at a frequency less than the Larmor frequency of the nucleons present; (4) acoustic energy put into formation at a frequency greater than the Larmor frequency of the nucleons present but at a frequency less than the Larmor frequency of electronic paramagnetic impurities present; and (5) acoustic energy put into formation at a frequency greater than the Larmor frequency of the electronic paramagnetic impurities present.

Accordingly, an object of the invention is to provide new and practical acoustically excited nuclear magnetic resonance methods for the remote detection and direct volumetric measurement of petroleum reservoirs.

It is yet another object of the invention to provide new and practical acoustically excited nuclear magnetic resonance apparatus for the remote detection and the direct volumetric measurement of petroleum reservoirs.

It is another object of the invention to provide new acoustically excited nuclear magnetic resonance methods appropriate for cased and uncased boreholes which measure the following parameters within an excitation zone around the borehole: total amount of fluid present, porosity of the formation, longitudinal relaxation times of the constituent fluids, the water saturation, and the oil saturation.

And finally, it is yet another object of the invention to provide new acoustically excited nuclear magnetic resonance apparatus appropriate for cased and uncased boreholes which measure the following parameters within an exitation zone around the borehole: total amount of fluid present, porosity of the formation, longitudinal relaxation times of the constituent fluids, the water saturation, and the oil saturation.

Figure 1:
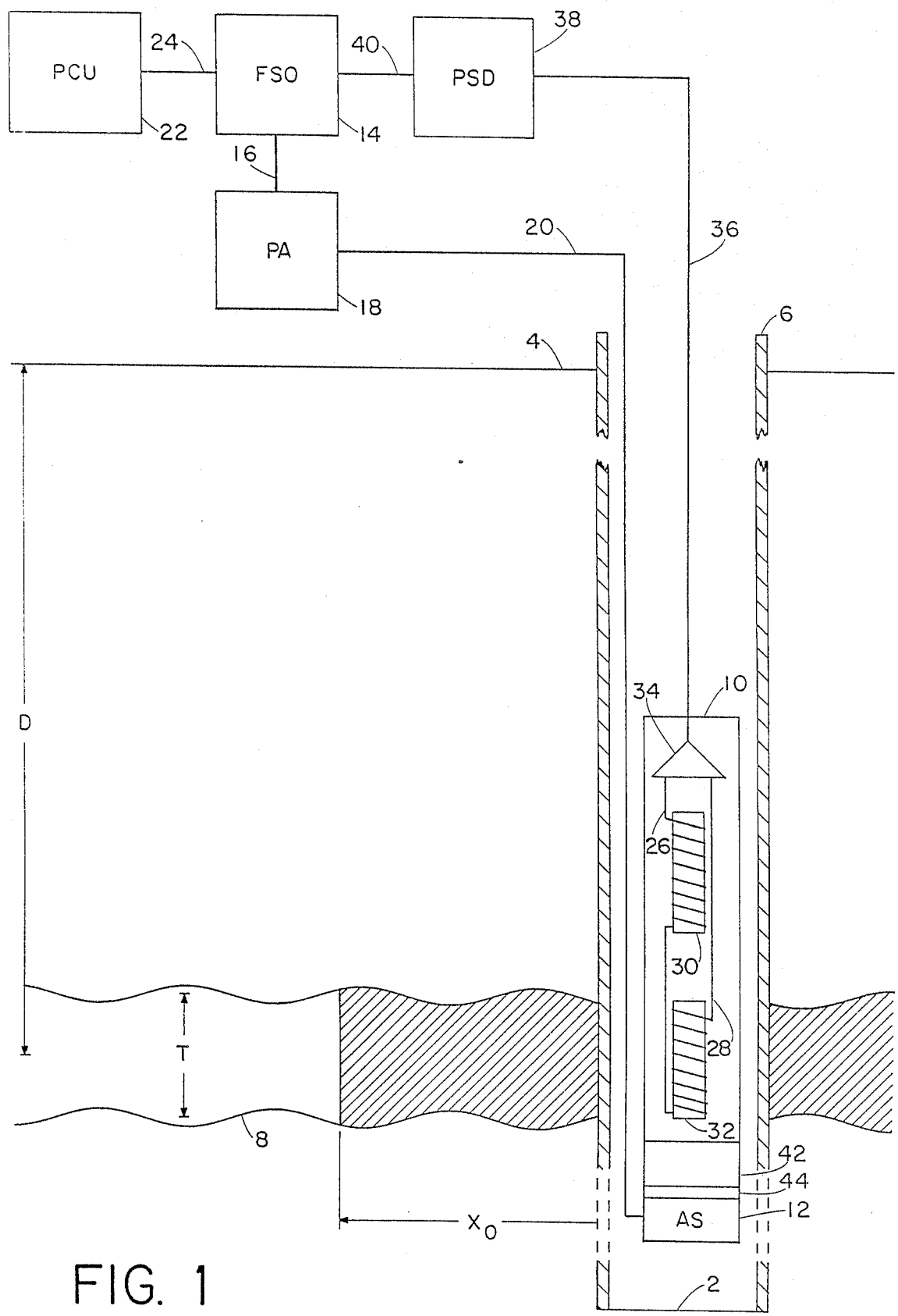
FIG. 1 shows a preferred embodiment of the Acoustic Paramagnetic Logging Tool.

FIG. 1 shows a preferred embodiment of the apparatus for the remote sensing and volumetric measurement of petroleum reserves. In an attempt to draw parallels between the new APLE and the PLE, FIG. 1 strongly resembles FIG. 19 in the U.S. patent application Ser. No. 720,943, now U.S. Pat. No. 4,656,422 (Ibid.). FIG. 1 shows the operation of the Acoustic Paramagnetic Logging Tool (APLT) which measures the APLE inside a case well. Operation inside an open borehole would be similar in nature.

A borehole 2 extends into the earth's surface 4 and is lined with steel borehole casing 6. An oil bearing reservoir 8 is in the vicinity of the casing and contains oil and connate water in general. A logging tool 10 is placed in the vicinity of the oil bearing formation. An acoustic source 12 (AS) is attached to the logging tool. A frequency sweep oscillator 14 (FSO) provides a repetitive frequency sweeping voltage via cable 16 to the power amplifier 18 (PA). The power amplifier drives cable 20 which energizes the acoustic source. The acoustic source provides acoustic waves to the fluid filled borehole which are swept from a frequency below the Larmor frequency to frequency above the Larmor frequency of the nucleons chemically bound to oil and water in the natural magnetic field of the earth. Under most circumstances, the acoustic source would repetitively frequency sweep through 2 kHz with a predetermined period. The period is determined by the settings on the programable control unit 22 (PCU) which starts and stops the frequency sweep oscillator and is connected to the frequency sweep oscillator by cable 24.

The repetitively frequency sweeping acoustic source which frequency sweeps through the Larmor frequency of the nucleons present causes the APLE within the adjacent formation. The acoustic source is coupled to the formation through the fluid filled borehole and through the steel pipe. The acoustic source is strong enough in intensity to "excite" the protons within the radius $X_0$ shown in FIG. 1. Therefore, within radius $X_0$, the protons becmoe repetitively excited and the APLE results in the repetitive excitation-saturation-relaxation process already described which in turn results in an amplitude modulation of the earth's magnetic field with the period determined by the setting on the PCU.

The amplitude modulation of the earth's magnetic field is sensed by a magnetic gradiometer within the borehole tool comprising windings 26 and 28 respectively on lengths of high permeability material 30 and 32 respectively which are arranged in a differential manner using differential amplifier 34. The differential output of the gradiometer passes to the surface via cable 36 into the input of the phase sensitive detector 38 (PSD). The phase sensitive detector obtains it's reference signal from a marker pulse issued when a certain frequency is crossed in the frequency sweep oscillator and which is sent from the frequency sweep oscillator to the phase sensitive detector by cable 40.

In addition, the borehole tool has an electronics section 42 and a means 44 of isolating the acoustic source 12 from the induction coils within the tool such as a layer of rubber material, etc. The acoustic source may itself be any convenient source such as an electromechanical speaker type arrangement or piezoelectric device, etc.

Figure 2:
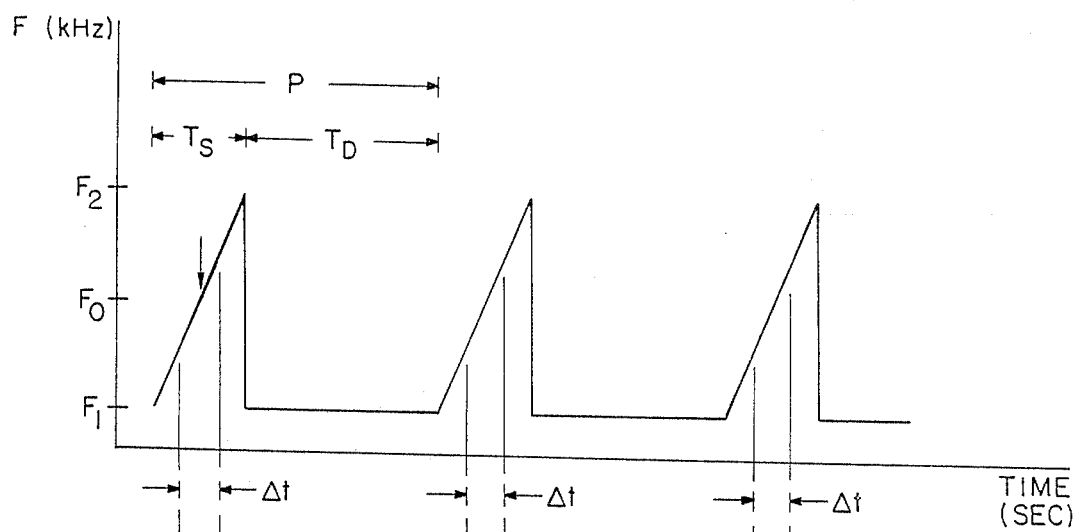
FIG. 2 shows a typical frequency sweep appropriate for the acoustic source.

FIG. 2 shows the frequency sweep of the acoustic source. $F_1$ is the start frequency, $F_o$ is the Larmor frequency of the nucleons present and $F_2$ is the stop frequency. The period is P, the sweep time is $T_s$ and the dead time is $T_D$. The acoustic source is "on resonance" for time $\Delta t$.

Figure 3:
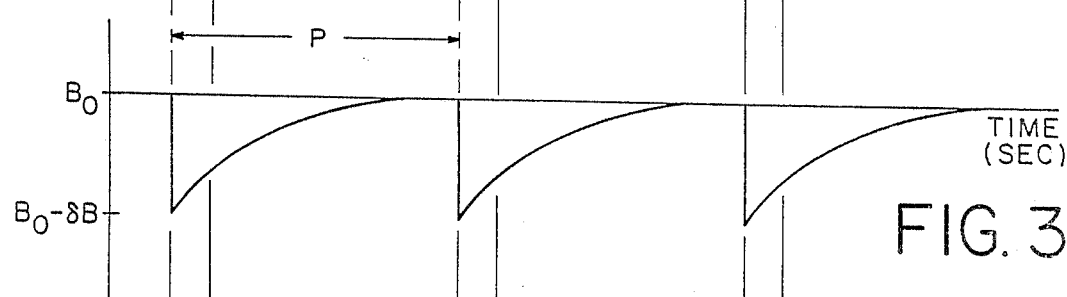
FIG. 3 shows a typical modulation of the earth's magnetic field due to the Acoustic Paramagnetic Logging Effect.

FIG. 3 shows the corresponding magnetic field variation with time. $B_o$ is the nominal strength of the D.C. magnetic field of the earth, and $\delta B$ is the decrease in the magnetic field of the earth caused by the excitation of the nucleons in the formation by the acoustic source on resonance.

Figure 4:
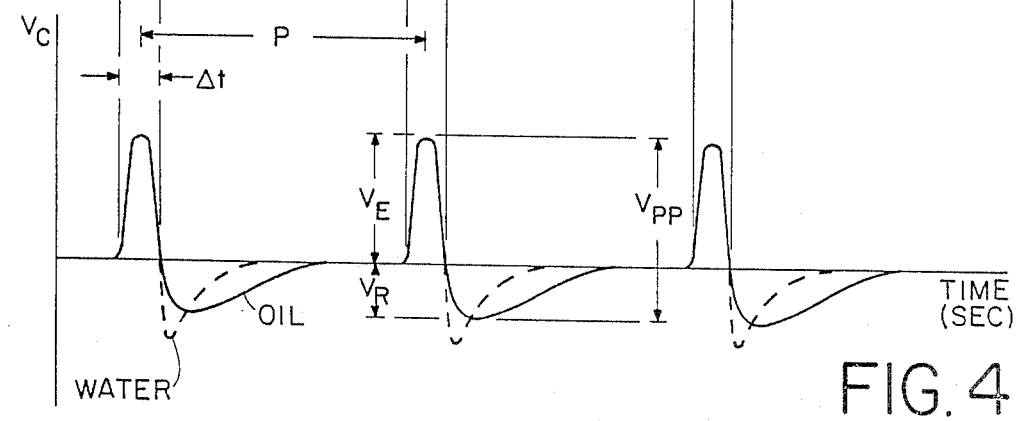
FIG. 4 shows the output of a typical induction coil within the tool.

FIG. 4 shows the voltage output from one of the induction coils comprising windings 26 on high permeability material 30 for example. $V_E$ is due to the excitation and $V_R$ is due to relaxation of the nucleons. $V_{pp}$ is the peak to peak voltage produced in the induction coils by the repetitive excitation-saturation-relaxation process caused by the repetitively frequency swept acoustic source.

The times $T_S$ and $T_D$ can be adjusted such that acoustic nuclear magnetic resonance is achieved in a time shorter than the longitudinal relaxation times of any fluid constituent of interest within said portion of the formation. These times can also be chosen instead to permit only the nucleons within the water within said portion of the formation to realign between sweeps if the longitudinal relaxation time of the water is shorter than that of the oil. Furthermore, these times can also be chosen to permit only the nucleons within the oil within said portion of the formation of realign between sweeps if the longitudinal relaxation time of the oil is shorter than that of the water. And lastly, these times can be chosen to allow the nucleons of both water and oil to realign between frequency sweeps.

The magnitude of the APLE, $\delta B$, for a given excitation radius $X_0$ would then be given by mathematical expressions similar to Equations 16, 17, 18, and 19 in U.S. patent application Ser. No. 720,943 (Ibid.). In addition, the intensity of the acoustic wave may be varied which allows a variable depth of investigation of the formation.

The longitudinal relaxation time $T_{1A}$ of a single fluid present in the acoustic field would be given by an equation analogous to Equation 22 in U.S. patent application Ser. No. 720,943, now U.S. Pat. No. 4,656,422 (Ibid.) where the ratio of the out-of-phase signal to the in-phase signal of the APLE (b/a) is given by the following:

$$b/a = -2\pi T_{1A}/P \qquad \text{Eq. 5}$$

Here $T_{1A}$ is the longitudinal relaxation time of a single fluid present in the acoustic field and P is the repetition period. Multiple fluid mixtures may be treated with an obvious extension of the theory as described in U.S. patent application Ser. No. 720,943, now U.S. Pat. No. 4,656,422 (Ibid.). Furthermore, as described in that application, the longitudinal relaxation times for oil and water are expected to be different in general which serves to distinguish between oil and water.

By using geophysical techniques similar to those presented to interpret the PLE in U.S. patent application Ser. No. 720,943, now U.S. Pat. No. 4,656,422 (Ibid.), the APLE can also yield the following geophysical aparameters within the excitation zone of the formation: the total amount of fluid present, the porosity of the formation, the longitudinal relaxation times of the constituent fluids, the water saturation, and the oil saturation.

It should be apparent that the apparatus in FIG. 1 can also be used to measure the electronic paramagnetic impurities present using an acoustic source whose frequency is appropriate to the Larmor frequency of those impurities present. An analogous situation was presented in U.S. patent application Ser. No. 720,943, now U.S. Pat. No. 4,656,422 (Ibid.) wherein the PLE apparatus could also be used to measure electronic impurities as well. In this case, the apparatus places the formation into a state of acoustic electronic paramagnetic resonance.

In addition, it should be emphasized that the apparatus in FIG. 1 works provided with intensity of the acoustic source is sufficiently strong to cause true saturation of the nucleons present which in turn causes the paramagnetism of the formation to disappear on resonance. However, if the intensity of the acoustic source is not strong enough to cause saturation, the methods outlined so far would not allow measurement of the petroleum present. In this case, another embodiment of the invention appears in FIG. 5 which combines both the standard features of the PLE apparatus in combination with an extra acoustic source.

Figure 5:
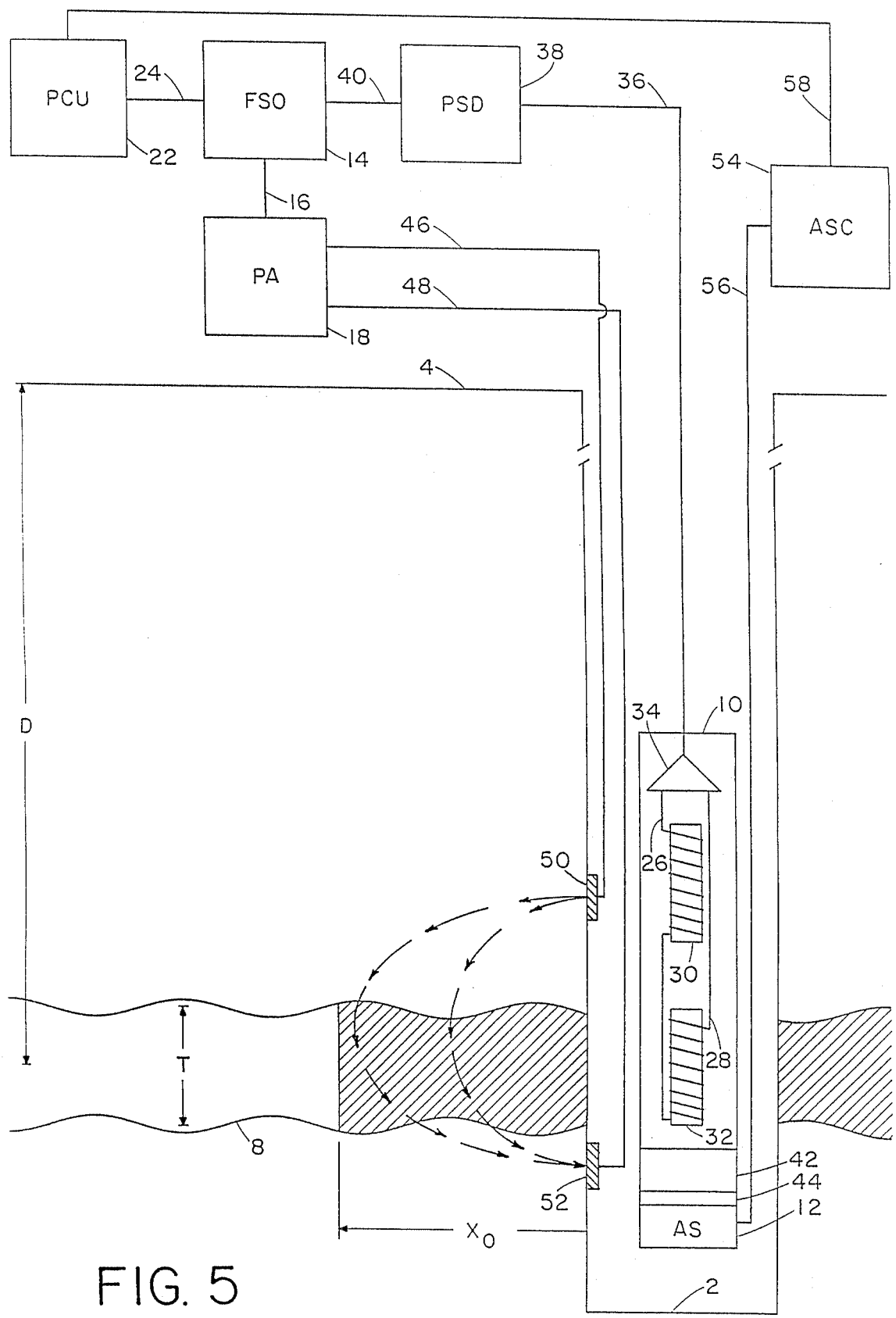
FIG. 5 shows a combination of the standard PLE used in the presence of an additional acoustic source.

The elements shown numbered through number 44 have already been defined in FIG. 5. Here, however, there is no borehole casing, and the hole is therefore an 'open hole'. In addition, the power amplifier 18 is used here to pass current through the formation. Cables 46 and 48 respectively are attached to electrodes 50 and 52 respectively which are used to pass A.C. current through the formation as in a standard PLE apparatus. However, in addition, the acoustic source control 54 (ASC) is used to energize the acoustic source 12 through cable 56. The logic which controls the amplitude and frequency of the ASC is derived from the programable control unit via cable 58.

Here, the purpose of the acoustic source is to affect the longitudinal relaxation times of the nucleons present while a standard PLE experiment is performed. Therefore, the intensity of the acoustic source is adjusted to primarily affect $T_{1A}$ times but not set strong enough to cause saturation. As mentioned several times, the acoustic source is expected to influence the longitudinal relaxation times of oil and connate water in dramatically different ways. Therefore, by performing a PLE experiment under the influence of different acoustic energy fields, separation of oil and water may be done under certain circumstances.

For example, it is theorized that acoustic waves at the Larmor frequency will interact with nucleons in a viscous fluid much more readily than in a non-viscous fluid (L.O. Bowen, Proc. Phys. Soc., 1966, Vol., 87, p. 717). Therefore, acoustic waves at the Larmor frequency may dramatically affect the $T_{1A}$ times of oil but leave the $T_{1A}$ times for connate water relatively unaffected. Therefore, first performing a PLE experiment with the acoustic source turned off, and then subsequently performing a PLE experiment with the acoustic source set to a fixed frequency at the Larmor frequency of the nucleons present may make a change primarily in the oil signal. Such a procedure could be used to separate oil and water.

If on the other hand it is later found by experiment that acoustic sources shorten the $T_{1A}$ times of the connate water present, but leave the oil $T_{1A}$ times roughly the same, then simply turning on an acoustic source at the Larmor frequency of the nucleons present would get rid of the water signal entirely leaving only the oil signal. In fact, such a procedure could be used with a standard polarization-precession nuclear magnetic resonance tool now used in the industry to separate oil and water.

Figure 6:
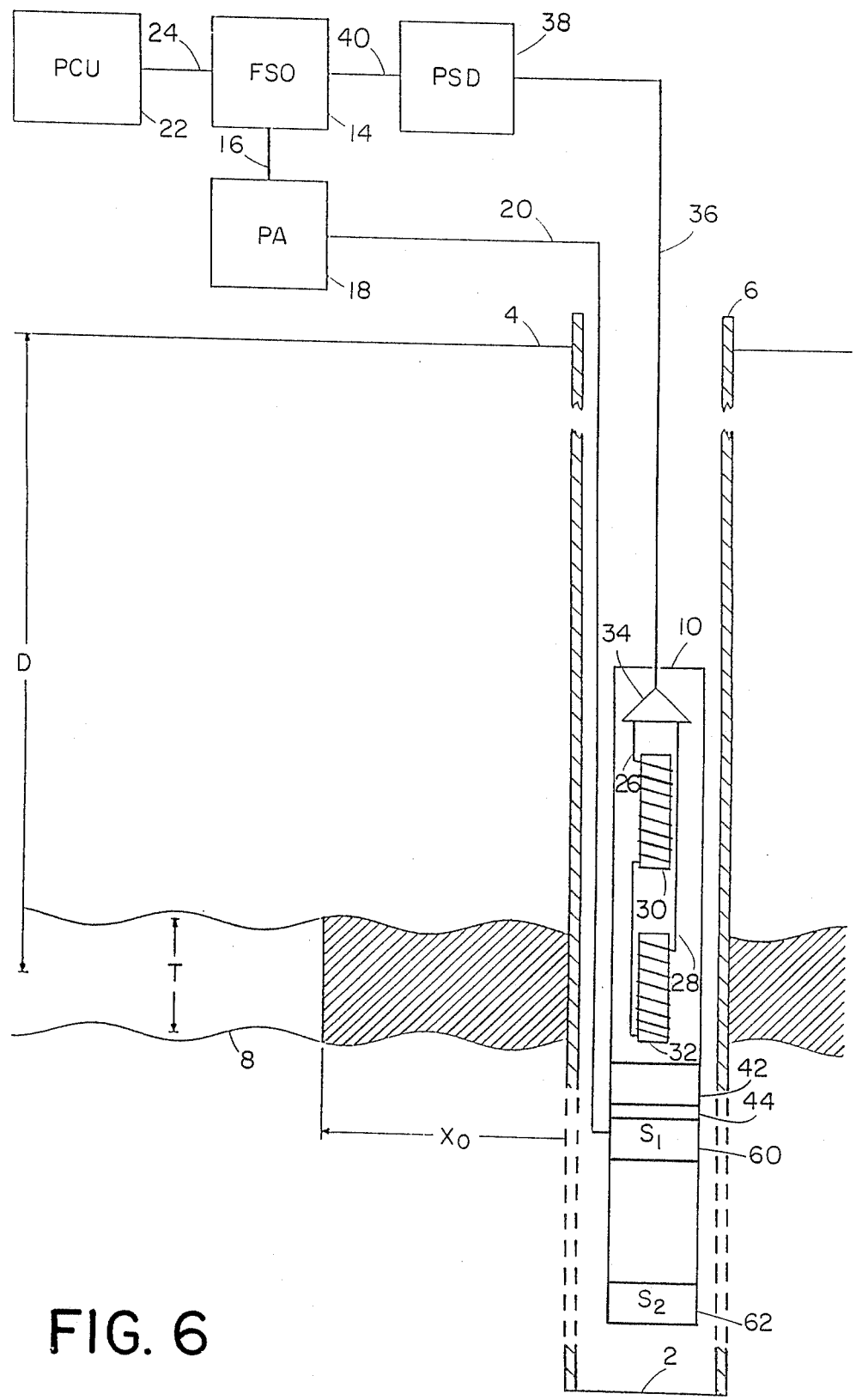
FIG. 6 shows a preferred embodiment of the Dual Excitation Acoustic Paramagnetic Logging Tool.

FIG. 6 shows another preferred embodiment of the invention which is called the Dual Excitation Acoustic Paramagnetic Logging Tool. FIG. 6 is similar to FIG. 1, except elements 60 and 62 have been added. Element 60 is the independent acoustic source described as $S_1(t)$ in Equation 1. Element 62 is the independent acoustic source described as $S_2(t)$ in Equation 2. Source $S_1(t)$ is frequency swept with the electronics provided by the power amplifier 18 and the frequency sweep oscillator 14 shown explicitly in FIG. 6. Source $S_2(t)$ is also frequency swept with similar electronics provided by another independent power amplifier and another independent frequency sweep oscillator which are not explicitly shown for reasons of brevity. Sources $S_1(t)$ and $S_2(t)$ are frequency swept in time such that the frequency difference between the two sources becomes equal to the Larmor frequency $f_L$ as described in Equation 3. Therefore, as the frequency difference between the two sources passes through the Larmor frequency of the protons present at the time defined in Equation 3, then excitation of the protons occurs. The two sources are repetitiously swept through the condition satisfied by Equation 3 which causes an amplitude modulation of the earth's magnetic field with a period defined by the frequency sweep time interval. Measurements of the amplitude modulation of the earths magnetic field with the magnetic gradiometer provides typical geophysical information as has already been described. Frequency sweep conditions may also be instead chosen to satisfy Equation 4 as well.

The two source configuration may provide to be exceptionally efficient for the following physical reasons. In a single acoustic source arrangement, a longitudinal acoustic source has a tendency to "push the nucleons uniformly back and forth" much as in the case with a compressional sound wave. Therefore, the acoustic coupling to the nucleons may not be very efficient. However, with two sources, the overlapping acoustic waves may cause significant tumbling motion of the oil and water molecules present due to the turbulence caused by simultaneous sound from the two different sources. Basically, the sound waves from two sources may cause molecules to collide as opposed to uniformly translate. This effect will be particularly noticeable if the two sources have different frequencies as outlined above. However, it may prove that even if the frequencies $F_1(t)$ and $F_2(t)$ are equal, and if each simply passes through the Larmor frequency repetitiously, that such turbulence will greatly enhance the acoustic coupling to the nucleons. Experiments in the field will determine which method is most efficient in producing good acoustic coupling to the nucleons present.

In addition, the acoustic source may be used to energize the formation at a frequency equal to the Larmor frequency of any electronic paramagnetic impurities which may be present. Such an arrangement may lead to an analogy of the Overhauser Effect (Theory of Magnetic Resonance, by Charles P. Poole, Jr., Ibid., Chapter 15). Basically the sound waves in this case are used to saturate the electronic paramagnetic impurities present which leads to a great increase in the nuclear paramagnetism by up to a factor of 1000. In the PLE, this greatly increased paramagnetism would be amplitude modulated in the usual manner, but the signal would be 1000 times bigger in amplitude! This would dramatically reduce the time necessary for taking data and/or the length of the induction coils necessary to achieve the necessary accuracy.

There are a very large number of other embodiments of the invention. One or more acoustic sources within a cased or uncased borehole can be used to cause excitation of the APLE. One or more sources of A.C. current applied to the walls of an open borehole may be used in conjunction with one or more sources of acoustic energy within the borehole to cause various types of APLE phenomena. In addition, one or more sources of D.C. current or low frequency current applied to the walls of a cased borehole may be used in conjunction with one or more sources of acoustic energy within the cased borehole to cause various types of APLE phenomena. And in addition, the acoustic sources may be adjusted to interact with the nuclear moments, the electronics paramagnetic moments, or perhaps both in the case of various types of Overhauser type phenomena in any of the above situations. And finally, the acoustic source strengths may be adjusted in any of the above situations for primarily saturation effects or for primarily effects upon the longitudinal relaxation times of the constituents present. In addition, any of the above acoustic sources may be varied in frequency during said measurements. And in general, in all the various configurations, two or more independent sources of acoustic energy may be independently frequency swept through different frequency sweep intervals whereby at one time during the frequency sweep interval, the frequency difference between the two sources becomes equal to the Larmor frequency of the paramagnetic substances present. And in particular, in FIG. 5, source AS can also be replaced with two or more such frequency swept sources and measurements suitably performed. Furthermore, source AS in FIG. 1 can be simultaneously energized with signals at frequencies $F_1(t)$ and $F_2(t)$ as defined in Equations 1, 2, and 3 which under certain circumstances, can accomplish the objectives of the two separate sources shown in FIG. 6. Similarly, source AS in FIG. 5 can also be simultaneously energized with the two different frequencies.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. Apparatus for remote detection and volumetric measurement of at least a portion of a petroleum reservoir in a geological formation having a borehole extending into the formation in the vicinity of the petroleum reservoir, comprising a first means of applying a periodically frequency sweeping acoustic energy field of the adjacent geological formation and a second means of applying a periodically frequency sweeping acoustic energy field of the adjacent geological formation.

whereby the frequency difference between the frequency of said first means and the frequency of said second means equals the Larmor frequency of any nucleons present for at least a portion of the period of the periodically sweeping acoustic energy field thereby placing a portion of the petroleum reservoir into a state of acoustic nuclear magnetic resonance which therefore causes a change in the paramagnetism of the formation thereby resulting in a change in the earth's magnetic field in the vicinity of said portion of the petroleum reservoir, and whereby the nucleons present include those nucleons which are chemically bound to any oil and water present, and means for simultaneously measuring the resulting change in the earth's magnetic field in the vicinity of said portion of the formation to provide an indication of the presence or absence of petroleum and other fluids such as water within said portion of the formation.

2. The method of detecting the presence of petroleum reserves in a formation adjacent to a borehole which comprises the steps of:

(a) applying acoustic energy to the formation from two independent acoustic sources which are frequency swept over different frequency sweep intervals whereby the frequency difference between the two sources equals the Larmor frequency of any nucleons present for at least a portion of the period of the frequency sweep interval to bring a portion of the reserves into a state of acoustic nuclear magnetic resonance to reduce the nuclear paramagnetism of said portion of the petroleum reserve; and (b) simultaneously detecting any change in the total magnetic field of the earth in the vicinity of said portion of the reserve at a minimum of two vertical positions to sense a change in the nuclear paramagnetism of said portion of the reserve at said positions whereby to indicate the presence or absence of petroleum and other fluids such as water within said portion of the reserve.

* * * * *